July 12, 1938.  E. KINSELLA  2,123,244
CONTROL DEVICE
Filed Sept. 24, 1935  2 Sheets-Sheet 1
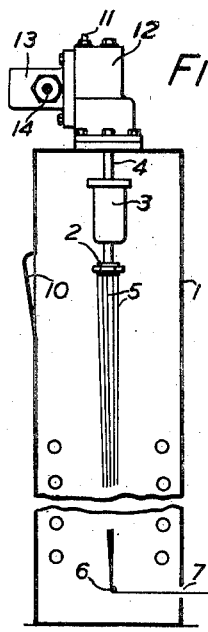
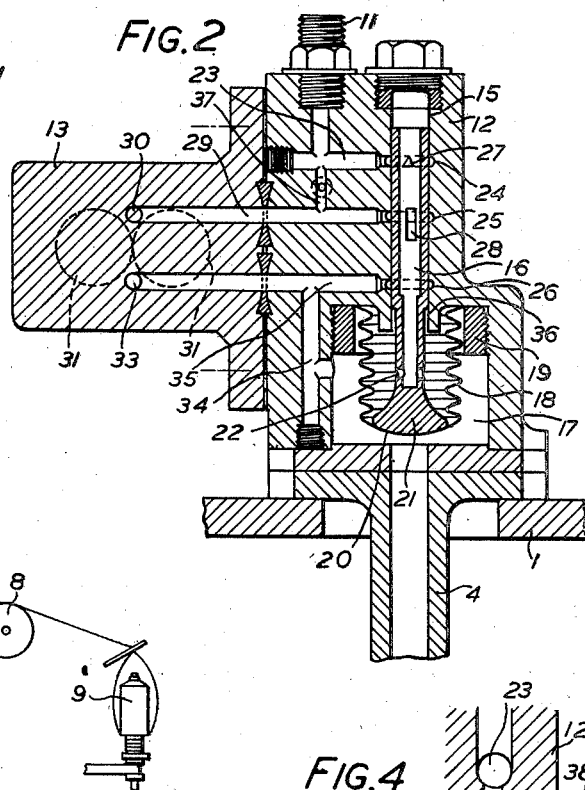
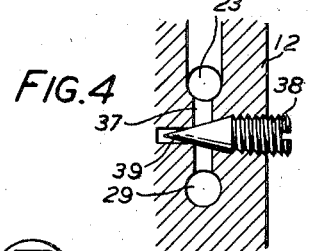
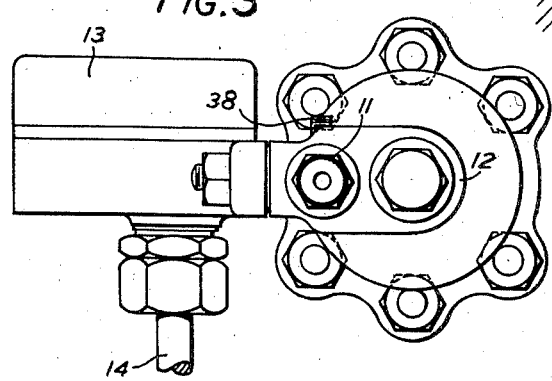
EDWARD KINSELLA
INVENTOR
ATTORNEYS July 12, 1938.  E. KINSELLA  2,123,244
CONTROL DEVICE
Filed Sept. 24, 1935   2 Sheets-Sheet 2
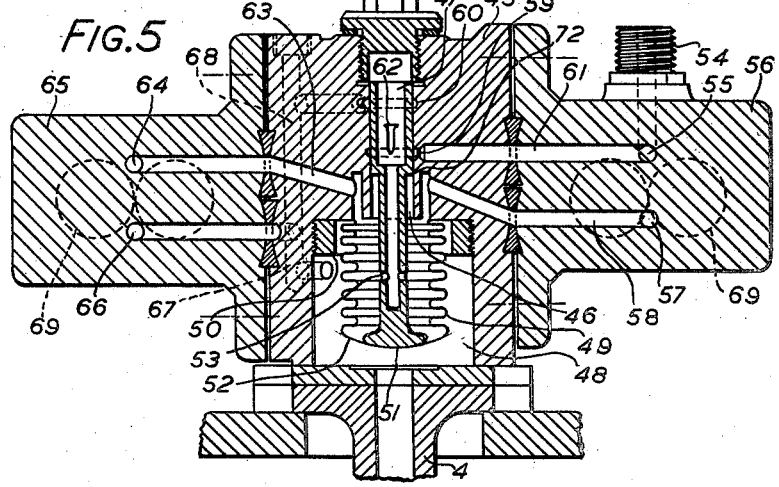
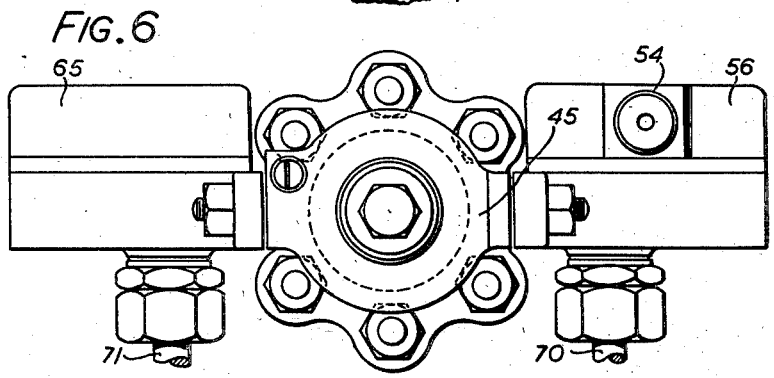
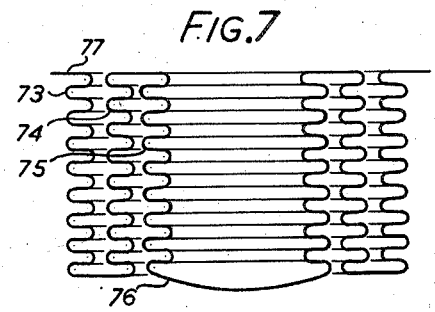
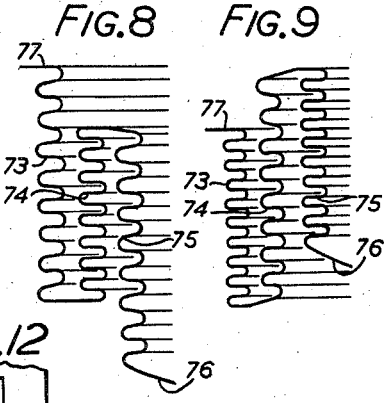
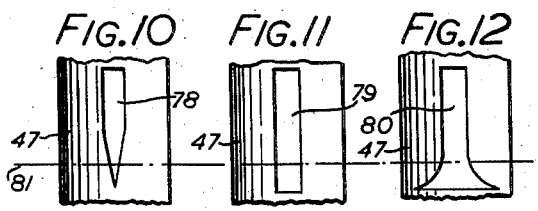
EDWARD KINSELLA
INVENTOR
ATTORNEYS Patented July 12, 1938

2,123,244

UNITED STATES PATENT OFFICE 2,123,244

CONTROL DEVICE

Edward Kinsella, Spondon, near Derby, England, assignor to Celanese Corporation of America, a corporation of Delaware Application September 24, 1935, Serial No. 41,893
In Great Britain October 3, 1934

1 Claim. (Cl. 103—11)

This invention relates to devices for controlling the flow of fluids, and is particularly concerned with devices which control such flow in accordance with the conditions of pressure obtaining in the body of fluid which is flowing.

It is an object of the present invention to provide an improved fluid flow-regulating device, and a particular object of the invention is to provide a device for use in combination with a measuring pump for maintaining the rate of delivery of a liquid by said pump substantially constant, said device being adapted to function with extreme accuracy for long periods without attention and to withstand abnormal variations in pressure between the two sides of the measuring pump without damage leading to inaccuracies. It is also an object of the invention to provide a device for this purpose, the construction of which lends itself to the provision of such means for stopping or diverting the flow of liquid in the event of such abnormal pressure conditions arising, and the invention includes devices provided with such means, as described hereafter.

It might be thought that a flow-regulating device in which the motor member comprises a flexible disc or diaphragm arranged to yield under any difference in pressure or any variation in the difference in pressure on its two sides and in so yielding to operate a throttle valve would afford a perfectly satisfactory means of controlling the output of a liquid from a measuring pump. I have found, however, that owing to the necessarily small range of movement of such a diaphragm necessitating the use of a relatively insensitive valve, slight variations in the constancy of output of a measuring pump controlled by such a device may occur after a long period of usage. Moreover, there is a danger when abnormal pressure conditions arise of such a disc being buckled or even burst. Such damage to the diaphragm may be unobserved for some time and may have the most serious effects on the quality of a product such as artificial silk which is dependent on constancy of the amount of spinning solution supplied to the spinning jet being maintained within very fine limits.

In U. S. Patent No. 1,760,070 I have described a flow-controlling device in which the motor member comprises a piston. Such a device is not subject to the same disadvantage as a device employing a diaphragm as motor member but I have found that slight inaccuracies may arise after a long period of operation as a result of corrosion or incrustation of the bore in which the piston slides, particularly since the possibility of such corrosion or incrustation is increased owing to the fact that the piston may remain in one position for a long time.

In the flow-controlling device of the present invention there is employed as a motor member a collapsible metal bellows.

Such a bellows may conveniently consist of a cylinder of sheet metal having deep circumferential corrugations therein so as to be capable of expanding or collapsing in an axial direction under differences of pressure inside and outside. A motor member of this kind does not depend upon the sliding of surface over surface, as is the case of a piston, and in consequence inaccuracies due to irregularity of the surfaces over which the piston slides, are avoided. At the same time, a large range of motion may be obtained, and the disadvantages inherent in the use of a disc or diaphragm are avoided.

If it is desired to obtain a greater range of movement than is conveniently possible with a single bellows fitting in the space available, a multiple bellows may be employed, comprising two or more corrugated cylinders nesting one inside the other, and joined together in series, the connections between the cylinders occurring alternately at opposite ends.

As indicated above, the invention is of particular advantage in connection with the spinning of artificial silk, and for this purpose it may be incorporated in the flow regulating device described in British specification No. 182,154 according to which two pumps are employed, one of which feeds an excess of spinning solution from a source of supply to the other, while the other works under equal pressures on the two sides and acts purely as a measuring device. A flow regulating device, in connection with which the present invention may be employed, is incorporated between the pumps and feeds back a varying amount of fluid from the outlet to the inlet of the first pump in order to maintain the pressures at the outlet and the inlet of the second pump equal. Again, the invention may be employed in connection with the static measuring device whose use is described in U. S. Patent No. 1,884,739. Or again, the invention may be employed in the device described in U. S. Patent No. 1,884,737 according to which a single pump is employed having a flow regulating device adapted to maintain the pressures equal at the inlet and outlet of the pump so as to keep the rate of flow of fluid constant.

One particular advantage of the motor member according to the invention over a plate or diaphragm is that it may, by reason of its large range of movement, be caused to operate a safety device adapted to cut off the flow of fluid completely when the conditions of flow become too seriously deranged for the flow regulating device to adjust them. Thus, the conditions of flow may vary up to a point at which the valve controlled by the motor member and controlling the rate of flow reaches a position in which it is incapable of further adjustment. At this point, cut-off devices may be arranged to stop or divert the flow of fluid, and prevent damage to any part of the flow controlling device, or any other apparatus through which the fluid may be passing. Such a cut-off device requires for its operation a large and decisive movement which, while it may be obtained from a piston, cannot be obtained in the small range of movement available with a diaphragm.

A further advantage of the large range of motion available with the present invention is the possibility of employing a less sensitive valve for adjusting the rate of flow. When, as with a diaphragm, only a small movement is available, the valve operated by such movement must possess a very rapid and sensitive action. Such a sensitive valve, however, is liable to inaccuracy due to wear, quite a small amount of wear producing a large inaccuracy. With the large range of motion available in the present invention however, a less sensitive valve may be employed, and such a valve is less liable to inaccuracy through wear.

The sensitiveness of the valve may be adjusted by adjusting the width of the aperture of the valve, or may depend upon the position of the valve by reason of the provision of an aperture of varying width. Thus, if a relatively insensitive action is required, the aperture, which is covered or uncovered to a varying extent by the movement of the valve, may be in the form of a slot having an acutely angled V shaped end, or if a very sensitive and practically instantaneous action is required, the slot may have a wide flat end. Or again, when it is desired that the valve should be very sensitive near its closing point, but less sensitive when widely open, the last part of the aperture to be closed may be broad, while the rest of the aperture is relatively narrow.

The motor member according to the invention may be submitted to considerable range of pressure differences inside and outside and will work effectively at all intermediate points within such range, the acquisition of a permanent set or buckle (a disadvantage to which discs and diaphragms are particularly liable and which causes them to move sharply from one position to another) being avoided.

By way of example some forms of flow controlling devices according to the invention will now be described in greater detail with reference to the accompanying drawings in which;

Figure 1 is a sectional side elevation of a spinning cell provided with a flow control device adapted to work with a single pump;

Figure 2 is a sectional side elevation, and Figure 3 a plan view of the pump and flow controlling device shown in Figure 1;

Figure 4 is a detail of Figures 2 and 3;

Figure 5 is a sectional elevation, and Figure 6 a plan view of a flow controlling device adapted to operate with two pumps; and Figures 7 to 12 show modifications of the apparatus shown in the preceding figures.

Referring to Figure 1, a spinning cell 1 is provided with a spinning jet 2 mounted upon a filter candle 3 fed with spinning solution by means of a connecting pipe 4. Artificial filaments 5 are extruded from the jet 2 and proceed down the cell 1, turning round a guide 6 near the bottom of the cell, and leaving the cell by an opening 7. The filaments then pass round a feed roller 8 and are collected by a cap spinning device 9. A door 10 is provided in the side of the cell 1 to give access to the spinning jet 2. The spinning solution is supplied through a supply pipe 11 leading into the body 12 of the flow controlling device according to the invention, and is pumped to the connecting pipe 4 by means of a gear pump 13 driven by means of a shaft 14, the pump 13 and the arrangement thereof being as described in U. S. Patent No. 1,884,737.

The pump and the flow controlling device are shown in greater detail in Figures 2 to 4. The body 12 of the flow controlling device has a bore 15 into which fits a hollow cylindrical valve piston 16. The bore 15 communicates at its lower end with a large chamber 17 containing the bellows 18 employed in accordance with the present invention. The bellows 18 is secured by means of a screw threaded member 19 to the upper wall of the chamber 17, and is closed at the other end 20 so that it divides the chamber 17 into two parts, the bore 15 communicating with the part contained inside the bellows 18. The hollow valve piston 16 extends to the bottom of the bellows 18, and has a flattened head 21 secured to the closure 20. Perforations 22 in the hollow valve piston connect the inside of the piston with the inside of the bellows 18.

Spinning solution under pressure is fed by the supply pipe 11 through the passages 23 to the first of three annular grooves 24, 25, 26 in the bore 15, and passes to the inside of the piston 16 by way of a triangular aperture 27 in the wall of the piston, which aperture or slot is exposed more or less to the annular groove 24 according to the position of the piston 16. A further slot 28 lower down in the piston 16 communicates with the second annular groove 25, through which the spinning solution passes through a passage 29 to the inlet 30 of the spinning pump 13. The pump 13 is a gear pump, the two gear wheels, indicated at 31, being driven by means of the pump shaft 14.

The outlet 33 of the spinning pump communicates by means of a passage 34 with the part of the chamber 17 lying outside the bellows 18, and also communicates by means of a passage 35 with the third annular groove 26 which is normally completely masked by the piston 16. Into the chamber 17 runs a connecting pipe 4 which feeds the spinning solution to the filter candle 3 shown in Figure 1. It will be seen that the metal bellows 18 is submitted to the same pressure outside as the outlet to the pump, and to the same pressure inside as the inlet of the pump, communicating with the inlet of the pump by means of the hollow piston 16 and the second annular groove 25.

In operation, if the pressure on the outlet side 33, of the pump 13 is higher than that on the inlet side 30, the bellows 18 is compressed and the piston 16 is raised. This opens more widely the aperture 27 communicating with the first annular groove 24, and allows the spinning solution to flow more freely to the pump inlet 30, raising the pressure on the inlet side of the pump until the pressures are substantially equal. So long as the pump 13 is thus maintained in operation under substantially equal pressures on the inlet side 30 and the outlet side 33 it will pass a constant flow of fluid. If the pressure on the outlet side 33 of the pump falls, and the pump tends to pass too much spinning solution, the metal bellows 18 expands, and the aperture 27 in the hollow piston 16 closes, so reducing the pressure on the inlet side 30 and restoring balance again.

If the pressure in the chamber 17 on the outlet side 33 of the pump 13 rises so high that the aperture 27 is exposed to the groove 24 to its full extent without affording the necessary relief, the bellows 18 will continue to collapse without being able to open the aperture 27 any more widely, and ultimately the shoulder 36 of the piston 16 will uncover the third annular groove 26, which has hitherto been completely masked. This will connect the inside of the bellows 18 with the outside and will connect the inlet 30 to the pump with the outlet 33. Thus any possibility of damage, either to the bellows 18 or to the pump 13 is removed, and the flow of spinning solution to the spinning jet 2 ceases. Such a condition might arise, for example, if the spinning jet became completely blocked with foreign matter, and required replacement.

On the other hand, if the pressure in the chamber 17 communicating with the outlet 33 of the pump falls abnormally (as, for example, if the spinning jet 2 is removed from the filter candle 3) the bellows 18 will expand until the aperture 27 is completely closed, so that the flow ceases.

In order that the mechanism may be restored to its working position when the fault which has given rise to the abnormal condition has been corrected, a bye-pass 37 is provided between the two passages 23 and 29 so that a spinning solution can be allowed to flow past the closed aperture 27 in order to raise the pressure in the chamber 17, so that the bellows 18 may be compressed, and the aperture 27 opened. When the aperture 27 is opened the bye-pass passage 37 is closed again. As is shown in Figure 4, the bye-pass passage is closed by means of a screw 38 having a pointed head 39 fitting on to a conical seating through which the bye-pass passage 37 passes.

The controlling device above described may also be employed in connection with the static measuring device described in U. S. Patent No. 1,884,739, an orifice being substituted for the pump 13, while the piston 16 is loaded, e. g. by means of a spring.

Another form of flow controlling device according to the invention may be employed in connection with two spinning pumps in series, as is described in British specification No. 182,154, the first pump being provided with a bye-pass from its outlet back to its inlet, the bye-pass being controlled by a valve operated in accordance with the pressure on the outlet and inlet sides of the second pump.

Such a device is shown in Figures 5 and 6 and comprises a body 45 having a bore 46 containing a hollow piston valve 47 and communicating at its lower end with a chamber 48 in which a bellows device 49 according to the invention is secured to the upper wall by means of a screw member 50. As in Figures 2 and 3, a mushroom head 51 at the lower end of the piston 47 is secured to a closure 52 at the bottom of the bellows, and the inside of the hollow piston 47 communicates with the inside of the bellows 49 by small passages 53. Spinning solution is fed by a supply pipe 54 to the inlet 55 of the first pump 56, and passes from the outlet 57 through a passage 58 to the inside of the bellows 49. Two annular grooves 59, 60 are provided in the bore 46, the lower groove 59 communicating by a passage 61 with the inlet side 55 of the first pump 56. A pointed aperture 62 in the wall of the piston 47 connects the inside of the piston 47 with the annular groove 59, so that the spinning solution is able to flow from the outlet 57 of the pump 56 to the inside of the bellows 49, through the hollow piston 47 and the aperture 62 to the inlet 55 of the first pump, the rate of flow in this direction being controlled by the extent to which the aperture 62 is exposed to the annular groove 59.

The inside of the bellows 49 also communicates by a passage 63 with the inlet 64 of the second pump 65, the outlet 66 of the second pump communicating by a passage 67 with a chamber 48 outside the bellows 49. From the chamber 48 the spinning solution flows through the connecting pipe 4 to the spinning jet 2, as shown in Figure 1. The chamber 48 also communicates by means of a passage 68 with the second annular groove 60 in the bore 46, the annular groove 60 being normally completely masked by the piston 47. Each of the two pumps 56, 65 comprises gear wheels indicated at 69, the two pumps being driven by two separate shafts 70, 71. The shaft 71 driving the pump 56 is driven faster than the shaft 70 driving the pump 65, so as to provide an excess flow, which returns from the outlet 57 of the pump 56 to the inlet 55.

In operation when the pressure inside and outside the bellows 49 are equal, the pressures at the inlet 64 and the outlet 66 of the second pump 65 are equal, and the pump 65 will pass the desired quantity of spinning solution. If the pressure outside the bellows 49 rises, e. g. by reason of a small obstruction in the spinning jet 2 or filter candle 3, the bellows 49 will collapse and raise the piston 47. This causes a smaller area of the aperture 62 in the piston 47 to be uncovered by the annular groove 59, and throttles the bye-pass from the outlet 57 to the inlet 55 of the first pump 56. As a result the pressure at the outlet 57 of the first pump rises until it is equal to the pressure on the outside of the bellows 49, when equilibrium is restored.

On the other hand, when the pressure outside the bellows falls, e. g. by the sudden clearing of a small obstruction in the spinning jet 2 or filter candle 3, the reverse happens. That is, the bellows 49 expands and opens more freely the aperture 62, so that pressure on the outlet side of the first pump and the inlet side of the second pump falls until it is equal to the pressure on the outlet side of the second pump.

If the pressure outside the bellows 49 should rise to such an extent as to close the aperture 62 completely without relief (as may occur in the event of a serious blockage of the spinning jet) then the bellows 49 will continue to collapse under the difference in pressure until the shoulder 72 of the piston 47 sharply uncovers the lower annular groove 59 and completely opens the bye-pass from the outlet 57 to the inlet 55 of the first pump 56. The second pump 65 then takes no spinning solution, and the flow to the spinning jet 2 stops. At the same time the aperture 62 is raised until it comes opposite the second annular groove 60 which is in communication with the outlet 66 of the second pump 65, and joins the inlet and the outlet of the second pump also, and the inside and the outside of the bellows 49. The apparatus will now run idly until it receives the necessary attention, after which the bellows 49 acts as a spring to restore the mechanism to its working position.

If, on the other hand, the pressure of the outlet 66 of the second pump falls, e. g. by the removal of the spinning jet 2, the bellows 49 will expand, and the piston 47 will drop until its upper end unmasks the upper groove 60 and places the inside of the bellows 49 and the inlet to the second pump 65 in communication with the outside of the bellows 49 and the outlet 66 of the second pump. The aperture 62 of the the piston 47 is so arranged that when this point is reached it opens the bye-pass to the first pump 56 very widely, and makes a free communication between the inlet and the outlet of the first pump also.

Instead of the simple form of bellows described with reference to the preceding figures, the compound form of bellows illustrated in Figures 7 to 9 may be employed in order to obtain a larger range of motion for the piston valve controlling the flow of fluid. The compound bellows comprises three corrugated cylindrical members 73, 74, 75, a closure 76 being provided for the inner member 75. Figure 7 shows a whole device in a mean position, the bellows being neither expanded nor contracted.

Figure 8 shows one half of the bellows in an expanded condition, the members 73, 75 being stretched while the member 74 is compressed, the distortion of each of the three members contributing to an increase of the distance between the rim 77 of the bellows and the enclosure 76. In Figure 9 one half of the bellows is shown contracted, the members 73, 75 being compressed, while the member 74 is stretched so that the distance between the rim 77 and enclosure 76 is greatly reduced.

Figures 10 to 12 show three forms which the apertures 27 or 62 may take. Figure 10 shows a section of a piston 47 having a slot having an acutely angled V-shaped bottom 78 suitable for use in connection with the mechanism described in Figures 5 and 6. This form of aperture gives a relatively insensitive action suitable for small flows, such as the flow returning from the outlet to the inlet of the first pump 56 described with reference to Figures 5 and 6.

If a more sensitive and practically instantaneous action is required, the slot may be of the form shown at 79 in Figure 11 having a flat bottomed edge co-linear with the edge 81 of the annulus in the cylindrical wall, i. e. 24 in Figures 1 to 3, or 59 in Figures 5 and 6.

Figure 12 shows a form of aperture 80 particularly suitable for the apparatus described with reference to Figures 1 to 3 in which the entire flow of fluid passes through the aperture. The portion of the aperture generally exposed to the annular groove is large, but the governing portion of the slot in the neighbourhood of the line 81 is small enough to avoid over-sensitivity and consequent hunting.

What I claim and desire to secure by Letters Patent is:—

Device for use in combination with a measuring pump and an auxiliary pump adapted to deliver at a higher rate than said measuring pump, for maintaining the rate of delivery of a liquid by said measuring pump substantially constant, said device comprising a chamber, a bellows which comprises a cylinder of sheet metal closed at one end and having deep circumferential corrugations, said bellows being mounted in said chamber with its open end in liquid tight engagement with a wall thereof and in such a way that a pressure change between the interior of said bellows and the surrounding space causes axial movement of said end, a valve casing having a bore co-axial with said bellows and opening into that part of the chamber enclosed by said bellows, outlet and relief passages in said casing and opening into said bore at different levels, the relief passage above the outlet passage, said outlet passage being adapted to be connected to the inlet of the auxiliary pump, said relief passage communicating with the space surrounding the bellows, means for connecting the outlet of the measuring pump to said space, outlet means for said space, means for connecting the interior of the bellows with the outlet of the auxiliary pump and the inlet of the measuring pump, a valve piston connected to the closed end of the cylinder and sliding in said bore, said piston having a reduced portion, an internal passage communicating with the interior of the bellows and open at the end remote from the bellows, and a peripheral port adapted in normal working to connect said internal passage with the outlet passage in the valve casing and to throttle the flow into said outlet passage, the arrangement being such that: so long as the piston is not moved beyond a predetermined range it keeps said relief passage closed and said port varies the amount of liquid bye-passed from the outlet of the auxiliary pump through the bellows to the inlet of said pump in accordance with variations in the pressure on the outlet side of the measuring pump in such a way as to keep the output of the measuring pump substantially constant, when the piston is moved beyond said range by excess pressure on the outlet side of the measuring pump the annular space between the reduced portion of the piston and the walls of the bore connects the outlet passage in the valve casing to the interior of the bellows so as to allow substantially the whole output of the auxiliary pump to be bye-passed to the inlet thereof and said port connects the relief passage to the internal passage in the valve, and when the piston is moved beyond said range owing to a deficiency of pressure on the outlet side of the measuring pump said port allows substantially the whole output of the auxiliary pump to be bye-passed to the inlet thereof and the open end of the internal passage in the valve connects said passage to the relief passage.

EDWARD KINSELLA.

CERTIFICATE OF CORRECTION.

Patent No. 2,123,244. July 12, 1938.

EDWARD KINSELLA.

It is hereby certified that error appears in the printed specification of the above numbered patent requiring correction as follows: Page 4, second column, line 13, in the claim, before "end" insert the word closed; and that the said Letters Patent should be read with this correction therein that the same may conform to the record of the case in the Patent Office.

Signed and sealed this 16th day of August, A. D. 1938.

Leslie Frazer (Seal) Acting Commissioner of Patents.